(12) United States Patent
Pon

(10) Patent No.: US 6,378,809 B1
(45) Date of Patent: *Apr. 30, 2002

(54) AFT DEPLOYABLE THERMAL RADIATORS FOR SPACECRAFT

(75) Inventor: Randy Pon, San Francisco, CA (US)

(73) Assignees: Space Systems; Loral, Inc., both of Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,396

(22) Filed: Sep. 16, 1998

Related U.S. Application Data

(60) Provisional application No. 60/061,672, filed on Oct. 10, 1997.

(51) Int. Cl.$^7$ .................................................. B64G 1/22
(52) U.S. Cl. ...................................... 244/173; 244/172
(58) Field of Search ................................ 244/163, 173, 244/172, 158 R

(56) References Cited

U.S. PATENT DOCUMENTS

| | | | | |
|---|---|---|---|---|
| 3,536,278 A | * | 10/1970 | Walley | 244/163 |
| 4,756,493 A | * | 7/1988 | Camaret | 244/173 |
| 5,027,892 A | * | 7/1991 | Bannon et al. | 244/163 |
| 5,117,901 A | * | 6/1992 | Cullimore | 244/163 |
| 5,494,241 A | | 2/1996 | Poulain | 244/163 |
| 5,787,969 A | * | 8/1998 | Drolen et al. | 244/163 |
| 5,794,890 A | | 8/1998 | Jones, Jr. et al. | 244/163 |
| 5,806,800 A | | 9/1998 | Caplin | 244/158 |
| 6,003,817 A | * | 12/1999 | Basuthakur et al. | 244/163 |

FOREIGN PATENT DOCUMENTS

| | | |
|---|---|---|
| EP | 0780293 | 6/1997 |
| EP | 0780302 | 6/1997 |
| EP | 0780303 | 6/1997 |
| EP | 0780304 | 6/1997 |
| EP | 0786404 | 7/1997 |
| EP | 0822139 | 2/1998 |
| EP | 0 849 166 A1 | 6/1998 |
| JP | 3 114999 A | 5/1991 |
| JP | 3 189299 A | 8/1991 |

* cited by examiner

*Primary Examiner*—J. Woodrow Eldred
(74) *Attorney, Agent, or Firm*—Perman & Green, LLP

(57) ABSTRACT

In a presently preferred embodiment of this invention a spacecraft includes at least four thermal radiator panels, with a first pair of said panels being initially stowed along a North facing surface of said spacecraft and a second pair of said panels being initially stowed along a South facing surface of said spacecraft. Each of said panels is coupled to a hinge mechanism at an anti-Earth facing end of said spacecraft and is rotatable by said hinge mechanism from a stowed position to a deployed position. The deployed position is a position that is off of the anti-Earth facing end of the spacecraft. In the presently preferred embodiment of this invention, when in the deployed position a longitudinal axis of each of said panels forms a non-zero angle with an Earth-pointing axis of said spacecraft.

15 Claims, 5 Drawing Sheets

AFT DEPLOYABLE THERMAL RADIATORS FOR SPACECRAFT

CLAIM OF PRIORITY FROM A COPENDING PROVISIONAL PATENT APPLICATION

Priority is herewith claimed under 35 U.S.C. §119(e) from copending Provisional Patent Application 60/061,672, filed Oct. 10, 1997, entitled "Aft Deployable Thermal Radiators for Spacecraft", by Randy Pon. The disclosure of this Provisional Patent Application is incorporated by reference herein in its entirety.

FIELD OF THE INVENTION

This invention relates generally to spacecraft and, in particular, to those spacecraft employing thermal radiator panels for removing heat from the spacecraft.

BACKGROUND OF THE INVENTION

It is known in the art to provide thermal radiators that are deployed off of the East/West sides of a spacecraft. Such panels are useful in removing heat from the spacecraft and radiating the heat into space. However, this conventional approach has a number of disadvantages. For example, the deployed radiation panels are not optimally positioned with respect to North/South mounted radiator panels. Further by example, the deployable radiator panels may have dimensional restrictions caused by field of view (FOV) requirements of East/West antenna reflectors and/or other spacecraft structures.

OBJECTS AND ADVANTAGES OF THE INVENTION

It is thus a first object and advantage of this invention to provide at least one thermal radiator panel that is deployable at the aft end of a spacecraft along, or at an angle to, a longitudinal or Z-axis of the spacecraft.

It is a further object and advantage of this invention to provide a plurality of aft-mounted thermal radiator panels that are canted when deployed with respect to a transverse edge of a spacecraft bus, thereby minimizing plume impingement from a centrally located thruster and also minimizing a chance of collision with other spacecraft structures, such as deployed solar array panels.

SUMMARY OF THE INVENTION

The foregoing and other problems are overcome and the objects of the invention are realized by methods and apparatus in accordance with embodiments of this invention.

In accordance with this invention a spacecraft comprises at least one thermal radiator panel that is moveable from a stowed position to a deployed position, said deployed position being off of an aft end of the spacecraft.

Further in accordance with this invention a spacecraft comprises at least one thermal radiator panel that is moveable from a stowed position to a deployed position, said deployed position being off of an aft end of the spacecraft, wherein in said deployed position a longitudinal axis of said panel forms a non-zero angle with a longitudinal axis (taken to be the Z-axis) of said spacecraft.

Further in accordance with this invention a spacecraft comprises at least one thermal radiator panel that is moveable from a stowed position to a deployed position, said deployed position being off of an aft end of the spacecraft, wherein in said deployed position a longitudinal axis of said panel intersects a Z-axis of said spacecraft.

Further in accordance with this invention a spacecraft comprises at least one thermal radiator panel that is moveable from a stowed position to a deployed position, said deployed position being off of an aft end of the spacecraft, wherein in said deployed position a transverse edge of said panel is non-parallel to a transverse aft edge of said spacecraft.

In a presently preferred embodiment of this invention a spacecraft includes at least four thermal radiator panels arranged as pairs of thermal radiator panels. A first pair of the panels is initially stowed along a North facing surface of the spacecraft and a second pair of the panels is initially stowed along a South facing surface of the spacecraft. Each of the at least four panels is coupled to a hinge mechanism at an anti-Earth facing end of the spacecraft and is rotatable by the hinge mechanism from a stowed position to a deployed position. The deployed position is a position that is off of the anti-Earth facing end of the spacecraft.

In the presently preferred embodiment of this invention, when in the deployed position a longitudinal axis of each of the at least four panels forms a non-zero angle with an Earth pointing axis of said spacecraft.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
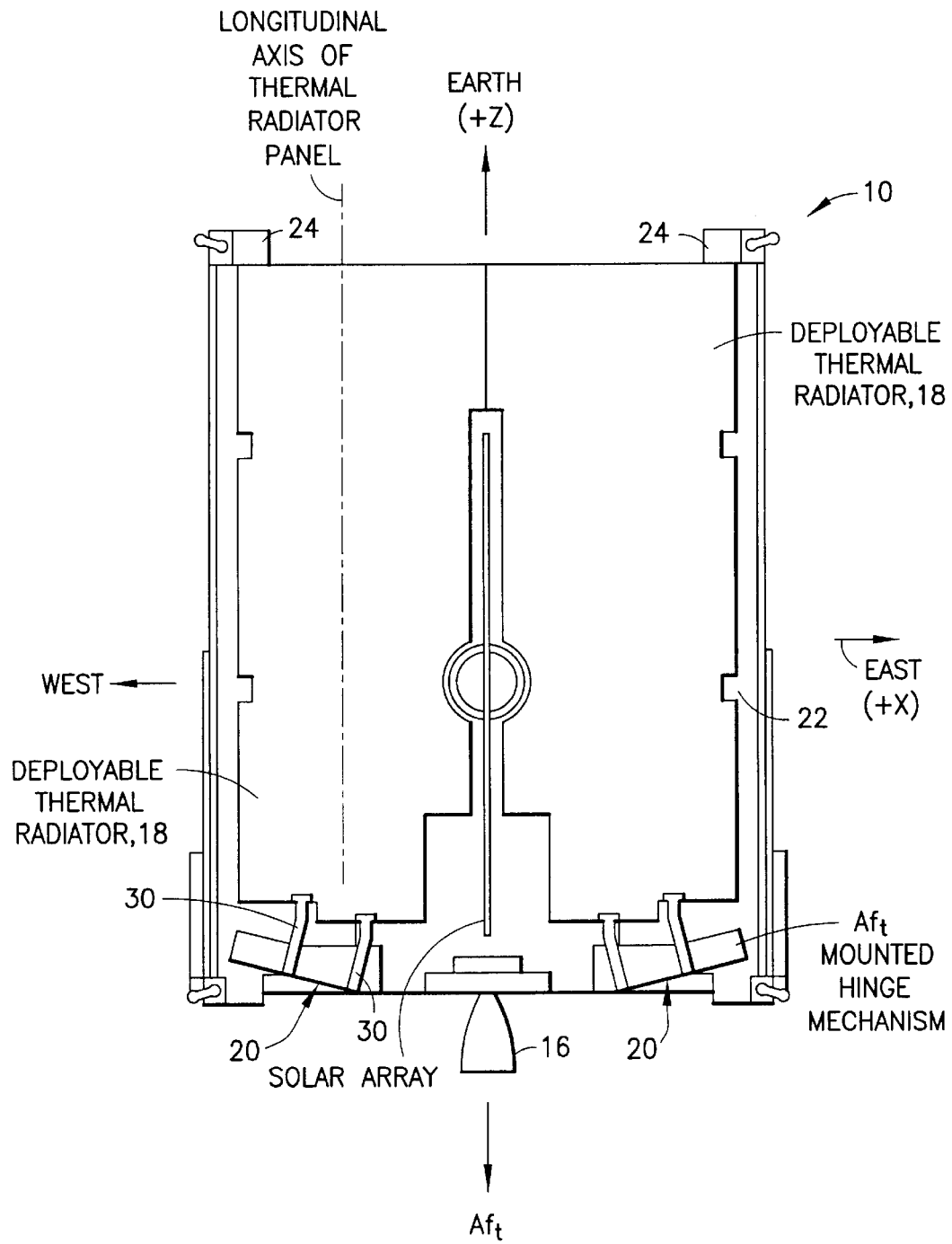
FIG. 1 is a view along a Y-axis of a spacecraft, showing a pair of deployable thermal radiator panels in a stowed position.
Figure 2:
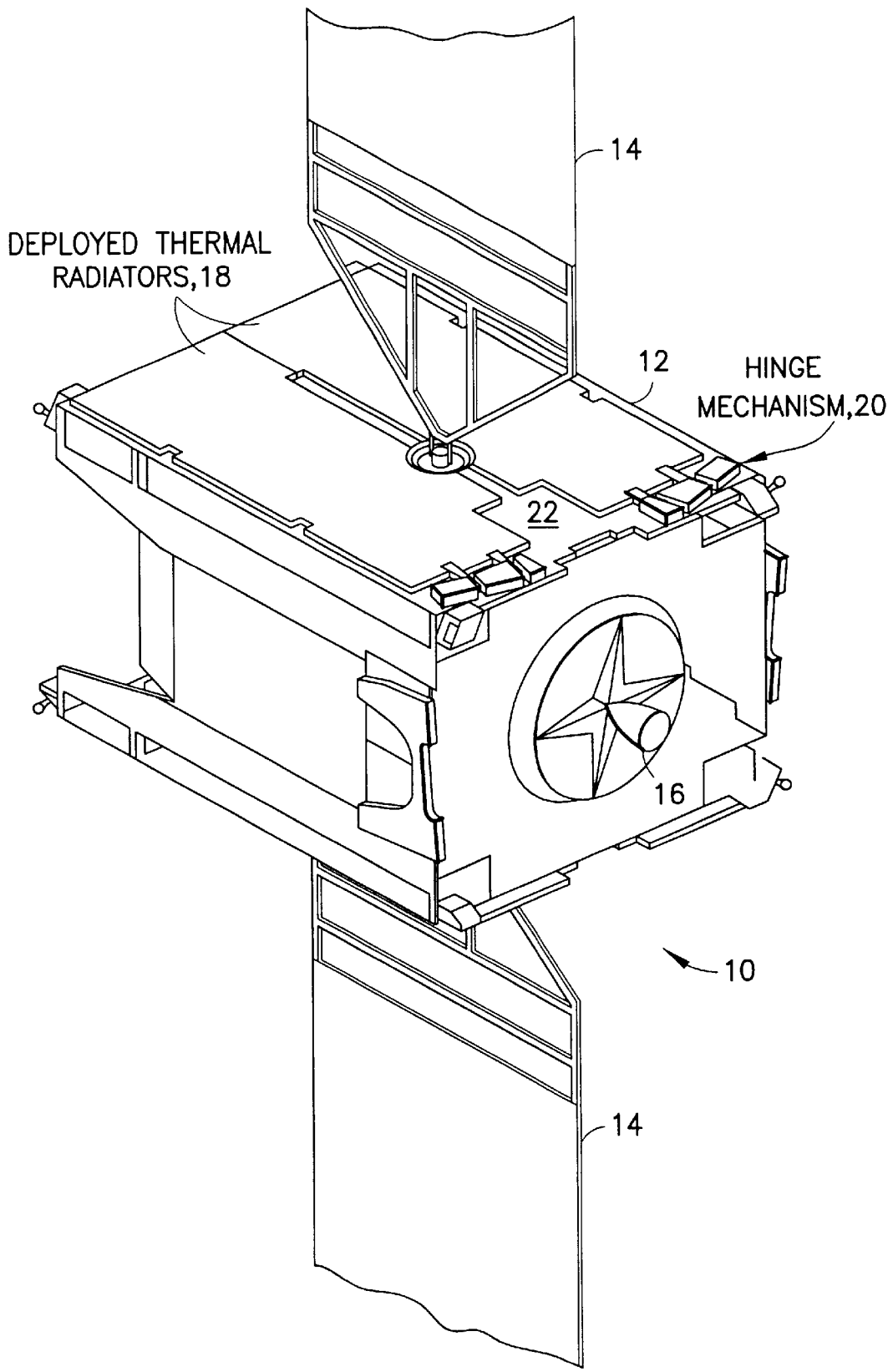
FIG. 2 is an isometric view of the spacecraft showing the pair of deployable thermal radiator panels in the stowed position.

Reference is made to FIGS. 1–5 for illustrating an exemplary embodiment of a spacecraft 10 having aft deployable thermal radiator panels 18 in accordance with this invention. The spacecraft 10 includes a spacecraft bus 12, solar array panels 14, an aft mounted thruster 16, the aft deployable thermal radiator panels 18, and thermal radiator panel hinge mechanisms 20. FIGS. 1 and 2 show the deployable thermal radiator panels 18 stowed against satellite North and South radiator panels 22. The hinge mechanisms 20 are located at the aft end of the satellite 10 along a transverse edge of the satellite bus 12. The satellite 10 includes a mechanism, such as a releasable clamp 24, for holding the thermal radiator panels 18 in the stowed position. When the holding mechanism is released after launch, each thermal radiator panel 18 is enabled to rotate about an axis that passes through its respective hinge mechanism 20 to assume a fully deployed position. This rotation is depicted by the arrow A in FIG. 5. As seen best if FIGS. 3 and 4, when in the deployed position, the thermal radiation panels 28 stand-off aft, or in an anti-Earth direction from the aft end of the spacecraft 10. The hinge mechanisms 20 may include a spring tension mechanism for rotating the thermal radiator panels 18, or any other mechanism that is suitable for rotating the thermal radiator panels from the stowed to the deployed position.

When deployed, heat is transported from the satellite 10 to the aft deployed thermal radiator panels 18 via any suitable flexible heat transfer device, including loop heat pipes, capillary pump loops, and flexible heat pipes. The heat transfer device may be externally or internally connected the satellite's heat pipe network, or any discrete heat source within the satellite 10.

Exemplary dimensions for one of the deployable thermal radiator panels 18 are 50 inches by 100 inches. An exemplary thickness is in a range of 0.5 to 1 inch. The panels 18 can be constructed of any suitable material that is known for use fabricating thermal radiator panels, including honeycomb constructions. Each deployable thermal radiator panel 18 may have an optical solar reflector (OSR) on one or both sides. The panels 18 are preferably locked in position when deployed off of the aft end (also referred to herein as the anti-Earth pointing end) of the spacecraft 10. Although four panels 18 are shown (two pairs of panels), more or less than this number could be used.

Further in accordance with this invention the hinge mechanisms 20 are constructed such that the thermal radiator panels 18 are offset at an angle θ from the satellite's Z-axis (see FIG. 3) when fully deployed. One suitable angle is in a range of about 30 degrees to about 40 degrees, although other angles may be used if desired.

Figure 3:
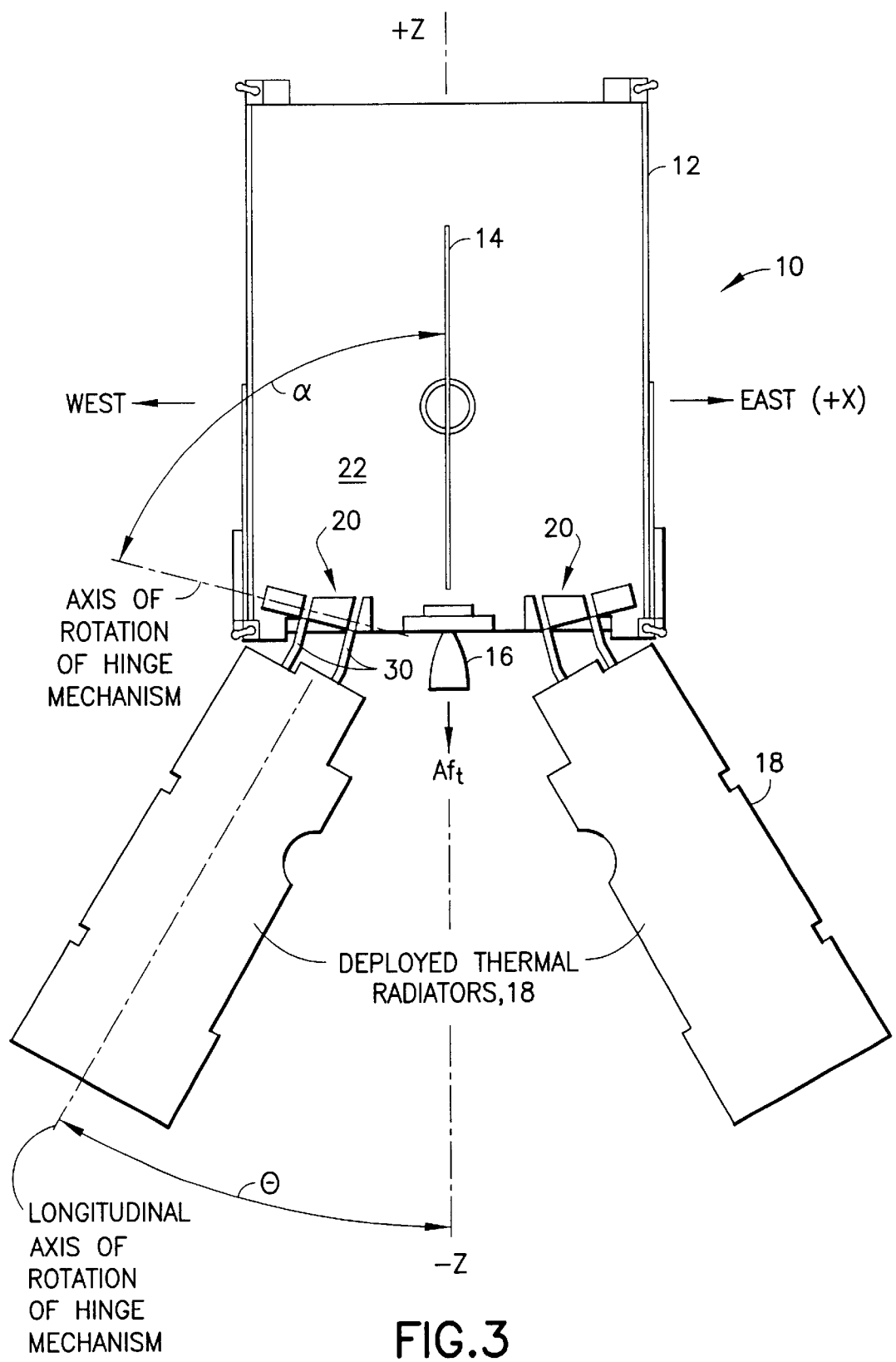
FIG. 3 is view along the Y-axis of a spacecraft, showing the pair of deployable thermal radiator panels in a fully deployed position.

As seen best in FIGS. 1 and 3, the hinge mechanisms 20 are mounted on the satellite such that the axis of rotation of each hinge mechanisms 20 is angled at an α relative to the Z-axis of the satellite 10. Each hinge mechanism 20 includes bent support members 30 connecting the corresponding thermal radiator panels 18 to the hinge mechanism. The bent support members 30 are bent to offset the angle α of the hinge mechanisms 20 so that when the radiator panels 18 are stowed, the longitudinal axis of each panel 18 is generally parallel with the Z-axis of the satellite 10. The angle θ between the longitudinal axis of each panel 18 in the deployed position and the Z-axis of the satellite 10 (see FIG. 3) is a generally complementary angle to the angle α between the axis of rotation of each hinge and the Z-axis of the satellite 10.

The aft deployment of the thermal radiator panels 18 in accordance with this invention allows a full 180° rotation to enable the radiator panels 18 to be parallel with the North/South radiator panels 22, thereby producing superior thermal performance.

The aft deployment further eliminates dimensional restrictions caused by East/West antenna reflector (not shown) field of view requirements.

The use of the canted angle at the final deployed position also minimizes plume impingement from the centrally located thruster 16 on the aft end of satellite 10.

Furthermore, the use of the canted angle at deployment also allows the radiator panels 18 to swing away from the deployed solar array panels 14, thus minimizing the chance of a collision during deployment.

Figure 4:
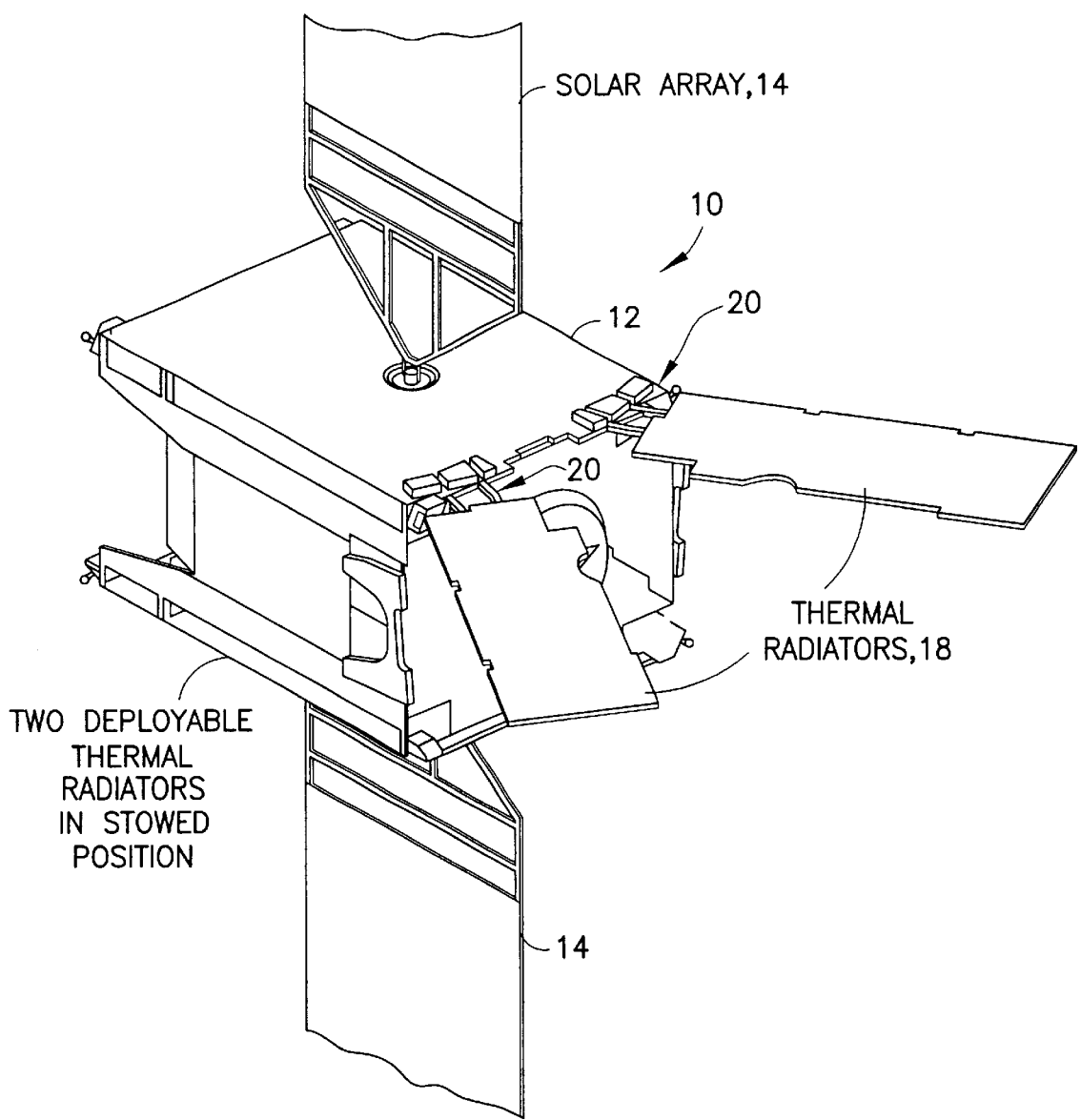
FIG. 4 is an isometric view of the spacecraft showing the pair of deployable thermal radiator panels in the deployed position.
Figure 5:
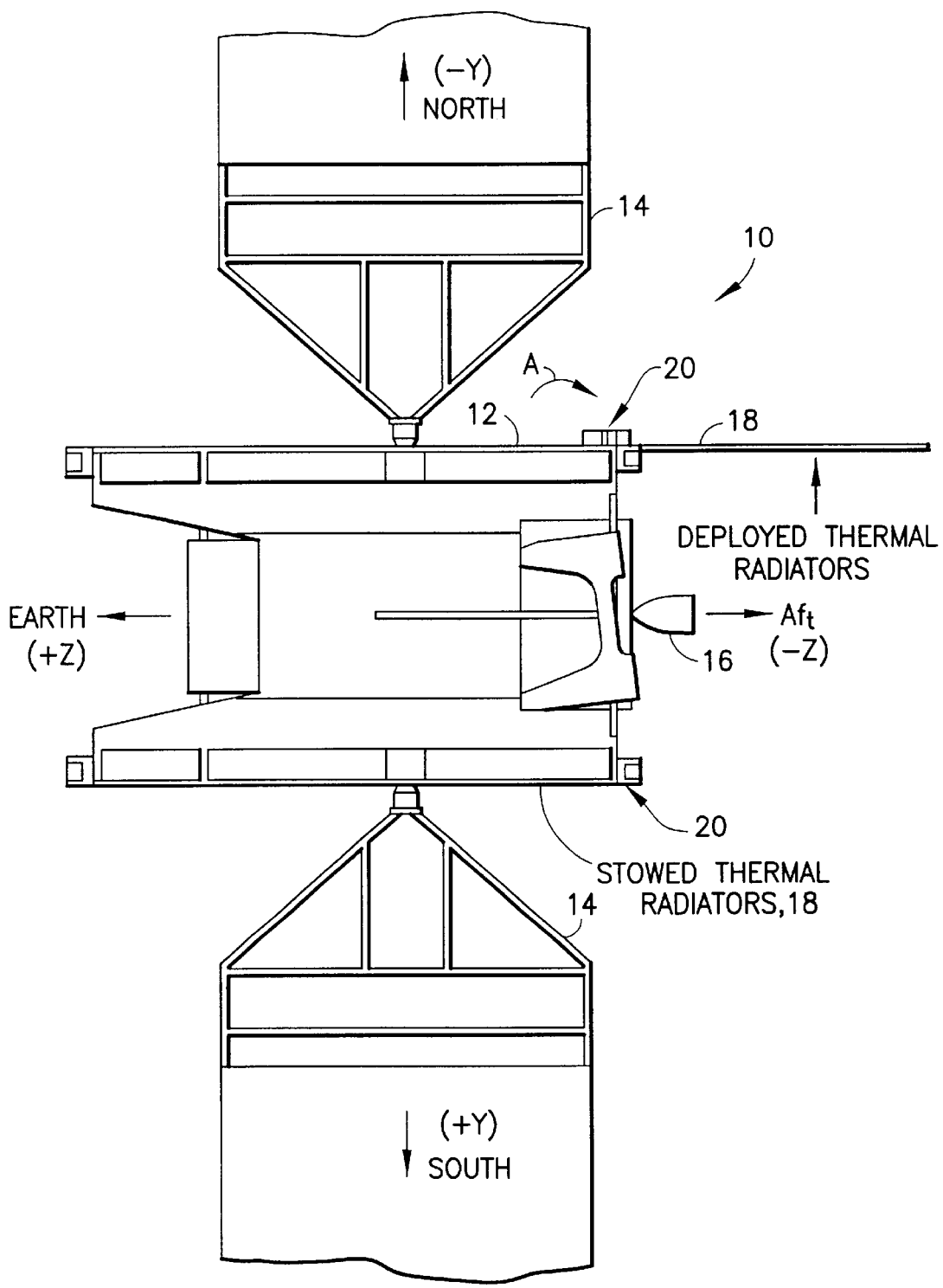
FIG. 5 is a view of the spacecraft along the X-axis showing one pair of the solar radiator panels in the deployed position and one pair in the stowed position.

Although the deployed radiator panels 18 are shown in FIGS. 4 and 5 as being essentially coplanar with the spacecraft bus 12 North and South surfaces, in particular the North and South radiator panels 22, it is within the scope of the teaching of this invention to provide the hinge mechanisms such that the deployed radiator panels are parallel with, but offset from (either above or below), the North and South surfaces of the spacecraft bus 12.

Thus, while the invention has been particularly shown and described with respect to preferred embodiments thereof, it will be understood by those skilled in the art that changes in form and details may be made therein without departing from the scope and spirit of the invention.

What is claimed is:

1. A satellite comprising a satellite bus having at least one thermal radiator panel that is moveable, from a stowed position to a deployed position, wherein when the thermal radiator panel is in said deployed position said panel extends aft from an aft end of the satellite, the aft end of the satellite having an aft thruster.

2. A spacecraft comprising at least one thermal radiator panel that is moveable, from a stowed position to a deployed position, wherein in said deployed position said thermal radiator panel extends in an anti-Earth direction relative to an anti-Earth facing end of the spacecraft, and wherein in said deployed position a longitudinal axis of said panel forms a non-zero angle with a longitudinal axis of said spacecraft.

3. A satellite comprising a satellite bus having at least one thermal radiator panel that is moveable from a stowed position to a deployed position, said deployed position being located aft from an aft end of the satellite, the aft end of the satellite having an aft thruster, wherein in said deployed position an axis of said panel intersects a Z-axis of said satellite.

4. A spacecraft comprising at least one thermal radiator panel that is moveable, from a stowed position to a deployed position, wherein in said deployed position said thermal radiator panel extends in an anti-Earth direction from an anti-Earth pointing end of the spacecraft, wherein in said deployed position a transverse edge of said panel is non-parallel to a transverse aft edge of said spacecraft.

5. A satellite comprising a satellite bus having at least two thermal radiator panels that are moveable from a stowed position to a deployed position, wherein in said deployed position said thermal radiator panels extends aft from an aft end of the satellite, the aft end of the satellite having an aft thruster, and wherein in said deployed position a longitudinal axis of each of said panels forms a non-zero angle with a longitudinal axis of said satellite.

6. A spacecraft comprising at least four thermal radiator panels, with a first pair of said panels being stowed along a first surface of said spacecraft and a second pair of said panels being stowed along a second surface of said spacecraft opposite the first surface, each of said panels being coupled to a hinge mechanism at an anti-Earth end of said spacecraft and being rotatable by said hinge mechanism from the stowed position to a deployed position, wherein in said deployed position each of said panels extends in an anti-Earth direction from the anti-Earth end of the spacecraft.

7. A spacecraft comprising at least four thermal radiator panels, with a first pair of said panels being stowed along a North facing surface of said spacecraft and a second pair of said panels being stowed along a South facing surface of said spacecraft, each of said panels being coupled to a hinge mechanism at an anti-Earth facing end of said spacecraft and being rotatable by said hinge mechanism from the stowed position to a deployed position, wherein in said deployed position each of said panels extends in an anti-Earth direction from the anti-Earth facing end of the spacecraft, and wherein in said deployed position a longitudinal axis of each of said panels forms a non-zero angle with an Earth-pointing axis of said spacecraft.

8. A spacecraft as in claim 7, wherein when deployed said first pair of panels is coplanar with said North facing surface of said spacecraft, and said second pair of panels is coplanar with said South facing surface of said spacecraft.

9. A spacecraft as in claim 7, wherein when deployed said first pair of panels is parallel with said North facing surface of said spacecraft, and said second pair of panels is parallel with said South facing surface of said spacecraft.

10. A spacecraft comprising at least one thermal radiator panel which is movable from a stowed position to a deployed position, wherein when the thermal radiator panel is in the deployed position the panel extends aft from an aft end of the spacecraft, and wherein when in the deployed position the thermal radiator panel is orientated in general planar alignment relative to the panel in the stowed position with a longitudinal axis of the panel in the deployed position being angled relative to the longitudinal axis of the panel in the stowed position, wherein when in the deployed position the thermal radiator panel is generally parallel with the panel when in the stowed position.

11. A spacecraft in accordance with claim 10, wherein when in the deployed position the thermal radiator panel is generally co-planar with the panel when in the stowed position.

12. A spacecraft comprising at least one thermal radiator panel having a hinge mechanism for rotating the panel from a stowed position to a deployed position, the hinge mechanism having an axis of rotation angled at a first angle relative to a Z-axis of the spacecraft, and the hinge mechanism being adapted for positioning the panel in the stowed position with a longitudinal axis of the panel substantially parallel with the Z-axis of the spacecraft, and for positioning the panel in the deployed position with the longitudinal axis of the panel angled at a second angle relative to the Z-axis of the spacecraft wherein the second angle is a generally complementary angle to the first angle, and wherein when in the deployed position the thermal radiator panel is generally parallel with the panel when in the stowed position.

13. A spacecraft in accordance with claim 12, wherein when in the deployed position the thermal radiator panel is generally co-planar with the panel when in the stowed position.

14. A spacecraft in accordance with claim 12, wherein the spacecraft has an opposing pair of the thermal radiator panels.

15. A spacecraft in accordance with claim 14, wherein the spacecraft has two of the opposing pairs of the thermal radiator panels.

* * * * *

(12) EX PARTE REEXAMINATION CERTIFICATE (7736th)
United States Patent
Pon

(10) Number: US 6,378,809 C1
(45) Certificate Issued: Sep. 14, 2010

(54) AFT DEPLOYABLE THERMAL RADIATORS FOR SPACECRAFT

(75) Inventor: Randy Pon, San Francisco, CA (US)

(73) Assignee: Space Systems/Loral, Inc., Palo Alto, CA (US)

Reexamination Request:
No. 90/008,130, Jul. 26, 2006

Reexamination Certificate for:
Patent No.: 6,378,809
Issued: Apr. 30, 2002
Appl. No.: 09/154,396
Filed: Sep. 16, 1998

Related U.S. Application Data
(60) Provisional application No. 60/061,672, filed on Oct. 10, 1997.

(51) Int. Cl.
*B64G 1/46* (2006.01)
*B64G 1/50* (2006.01)
*B64G 1/22* (2006.01)

(52) U.S. Cl. ................................. 244/171.8; 244/172.7
(58) Field of Classification Search ........................ None
See application file for complete search history.

(56) References Cited

U.S. PATENT DOCUMENTS

| 5,634,612 A | 6/1997 | Faisant |
| 5,653,407 A | 8/1997 | Bertheux et al. |
| 5,833,175 A | 11/1998 | Caplin |
| 6,003,817 A | * 12/1999 | Basuthakur et al. ......... 244/164 |

FOREIGN PATENT DOCUMENTS

EP    786 404 A1  *  7/1997

OTHER PUBLICATIONS

Bill Harwell & Fred Edelstein, Advanced Thermal Control techniques For Emerging Communication Satellites, Am. Inst. on Aeronautics & Astronautics 19th Thermophysics Conf. (Jun. 25–28, 1984)(AIAA–84–1774).
W.H. Kelly & J.H. Reisenweber Jr., Thermal Modeling and Design Considerations For Large Communications Spacecraft, Am. Inst. on Aeronautics & Astronautics 18th Thermophysics Conf. (Jun. 1–3, 1983)(AIAA–83–1463).

* cited by examiner

*Primary Examiner*—Peter C. English

(57) ABSTRACT

In a presently preferred embodiment of this invention a spacecraft includes at least four thermal radiator panels, with a first pair of said panels being initially stowed along a North facing surface of said spacecraft and a second pair of said panels being initially stowed along a South facing surface of said spacecraft. Each of said panels is coupled to a hinge mechanism at an anti-Earth facing end of said spacecraft and is rotatable by said hinged mechanism from a stowed position to a deployed position. The deployed position is a position that is off of the anti-Earth facing end of the spacecraft. In the presently preferred embodiment of this invention, when in the deployed position a longitudinal axis of each of said panels forms a non-zero angle with an Earth-pointing axis of said spacecraft.

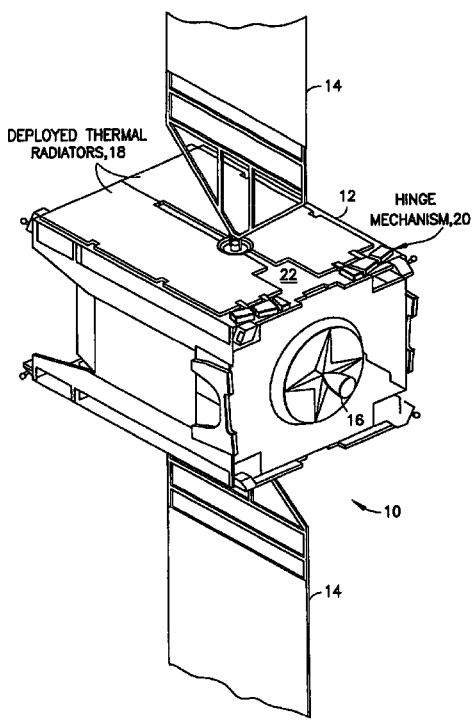
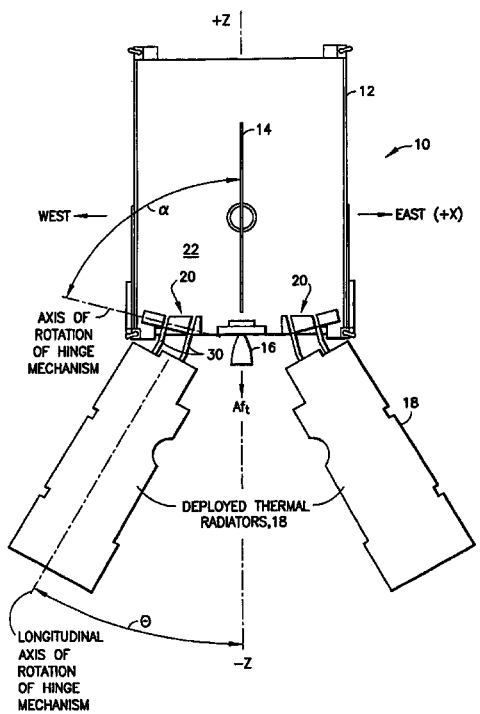

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4, 6, 10 and 11 is confirmed.

Claims 1 and 5 are cancelled.

Claims 2, 3, 7 and 12 are determined to be patentable as amended.

Claims 8, 9 and 13–15, dependent on an amended claim, are determined to be patentable.

2. A spacecraft comprising at least one thermal radiator panel that is moveable, from a stowed position to a deployed position, wherein in said deployed position said thermal radiator panel extends in an anti-Earth direction relative to an anti-Earth facing end of the spacecraft, [and] wherein in said deployed position a longitudinal axis of said panel forms [a non-zero] *an acute* angle with [a longitudinal] *an Earth-pointing* axis of said spacecraft, *and wherein in said deployed position said panel is generally parallel to a surface of said spacecraft that is adjacent to the anti-Earth facing end*.

3. A satellite comprising a satellite bus having at least one thermal radiator panel that is moveable from a stowed position to a deployed position, said deployed position being located aft from an aft end of the satellite, the aft end of the satellite having an aft thruster, wherein in said deployed position [an] *a longitudinal* axis of said panel intersects [a Z-axis] *an Earth-pointing axis* of said satellite, *and wherein when in said deployed position the thermal radiator panel is generally coplanar with respect to the panel in the stowed position*.

7. A spacecraft comprising at least four thermal radiator panels, with a first pair of said panels being stowed along a North facing surface of said spacecraft and a second pair of said panels being stowed along a South facing surface of said spacecraft, each of said panels being coupled to a hinge mechanism at an anti-Earth facing end of said spacecraft and being rotatable by said hinge mechanism from the stowed position to a deployed position, wherein in said deployed position each of said panels extends in an anti-Earth direction from the anti-Earth facing end of the spacecraft, and wherein in said deployed position a longitudinal axis of each of said panels forms [a non-zero] *an acute* angle with an Earth-pointing axis of said spacecraft.

12. A spacecraft comprising at least one thermal radiator panel having a hinge mechanism for rotating the panel from a stowed position to a deployed position, the hinge mechanism having an axis of rotation angled at a first angle relative to [a Z-axis] *an Earth-pointing axis* of the spacecraft, and the hinge mechanism being adapted for positioning the panel in the stowed position with a longitudinal axis of the panel substantially parallel with the [Z-axis] *Earth-pointing axis* of the spacecraft, and for positioning the panel in the deployed position with the longitudinal axis of the panel angled at second angle relative to the [Z-axis] *Earth-pointing axis* of the spacecraft wherein the second angle is a generally complementary angle to the first angle, and wherein when in the deployed position the thermal radiator panel is generally parallel with the panel when in the stowed position.

* * * * *